United States Patent [19]

Stein et al.

[11] Patent Number: 5,215,635

[45] Date of Patent: Jun. 1, 1993

[54] METHOD FOR MAKING SILICONE GELS USING ULTRASONIC ENERGY

[75] Inventors: Judith Stein, Schenectady; Larry N. Lewis; Chris A. Sumpter, both of Scotia, all of N.Y.

[73] Assignee: General Electric Company, Schenectady, N.Y.

[21] Appl. No.: 806,392

[22] Filed: Dec. 13, 1991

[51] Int. Cl.$^5$ .............................................. C07B 61/00
[52] U.S. Cl. .......................... 204/157.62; 204/157.64
[58] Field of Search ...................... 204/157.64, 157.62, 204/157.42, 157.45

[56] References Cited

U.S. PATENT DOCUMENTS 4,447,633  5/1984  Boudjouk ............................ 556/479

OTHER PUBLICATIONS

Article-Organic Sonochemistry. Ultrasonic Acceleration of the Hydrosilation Reaction, Byung-Hee Han and Philip Boudjouk-American Chemical Society (1983)-Organometallics-pp. 769-771.

*Primary Examiner*—John Niebling
*Assistant Examiner*—C. Delacroix-Muirheid
*Attorney, Agent, or Firm*—William A. Teoli; William H. Pittman

[57] ABSTRACT

A method is provided for using ultrasonic energy to effect the rapid cure of one-part and two-part curable silicone compositions comprising a vinyl silicone, a silicon hydride siloxane and an effective amount of a platinum group metal catalyst.

12 Claims, No Drawings

METHOD FOR MAKING SILICONE GELS USING ULTRASONIC ENERGY

CROSS REFERENCE TO RELATED APPLICATION

Reference is made to Ser. No. 07/800,311 now abandoned, and Ser. No. 07/800,310 filed concurrently on or about Nov. 26, 1991.

BACKGROUND OF THE INVENTION

The present invention relates to a method for making silicone gels including elastomers, potting compounds and coating formulations, by subjecting a curable silicone mixture to ultrasonic energy, where the curable silicone mixture comprises a vinyl silicone, a silicone hydride siloxane and an effective amount of a platinum group metal catalyst.

Prior to the present invention, as shown by Lewis et al, U.S. Pat. No. 5,015,691, organopolysiloxane compositions curable by a platinum catalyzed hydrosilylation addition reaction, were generally cured by the use of heat. However, Boudjouk, U.S. Pat. No. 4,447,633 found that if ultrasonic energy were used, the addition of a silane having silanic hydrogen to an olefinically unsaturated compound such as 1-hexene or styrene could be effected. A supported platinum metal catalyst was used. The platinum catalyst preferred by Boudjouk was a platinum metal catalyst having a high surface area, such as a finely divided metal catalyst on a carrier such as carbon particles. Attempts to duplicate Boudjouk results by using ultrasonic energy to effect the hydrosilylation of an aliphatic compound to a silicon hydride, using an unsupported or homogeneous platinum catalyst, such as a platinum catalyst soluble in an organic solvent, for example the platinum complex shown by Karstedt, U.S. Pat. No. 3,775,452, were unsuccessful.

SUMMARY OF THE INVENTION

The present invention is based on the discovery that the formation of silicone gels, for example, elastomeric polydiorganosiloxanes, silicone potting compounds and coating compositions can be effected by subjecting a mixture of a vinyl silicone such as a vinyl containing polydiorganosiloxane fluid, a silicon hydride siloxane, and an unsupported or homogenous platinum catalyst, as defined, hereinafter, to ultrasonic energy.

STATEMENT OF THE INVENTION

There is provided by the present invention, a method for initiating a hydrosilylation reaction at ambient temperatures in a fluid organopolysiloxane mixture by the use of ultrasonic energy, comprising generating ultrasonic energy from an ultrasonic energy source while it is in contact with the organopolysiloxane mixture comprising a vinyl silicone, a silicon hydride siloxane and an amount of a platinum group metal catalyst to effect addition between the vinyl silicone and the silicon hydride siloxane.

There is further provided by the present invention a method which comprises, (1) forming a fluid mixture having a viscosity of from about 100 to about 1,000,000 centipoise which is capable of resisting a substantial increase in viscosity over a period of at least 2 hours at 25° C., which fluid mixture comprises by weight, (a) 100 parts of a vinyl silicone,
(b) from about 1 to about 40 parts of a silicon hydride siloxane, and
(c) an amount of a platinum group metal catalyst which is effective as a hydrosilylation catalyst for (a), and (b) and, (2) contacting the mixture of (1) with an ultrasonic energy generator while it is generating a frequency of from about 10 to about 50 kHz at a power output at point of contact with the mixture of (1) from $5 \times 10^{-5}$ to 100 watts/cm²/sec until the viscosity of the mixture of (1) is increased by about a factor of at least two.

Vinyl silicone which can be used in the method of the present invention is preferably a vinyl organopolysiloxane fluid, or "vinylsiloxane" which can have a viscosity of from about 100 to 200,000 centipoises. The preferred vinyl siloxanes are included within the following formula:

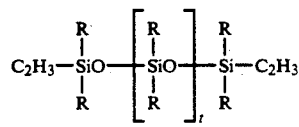

where $C_2H_3$ is vinyl, and R is selected from $C_{(1-13)}$ monovalent organic radicals free of olefinic unsaturation, and t is a positive integer having a value sufficient to provide a vinyl siloxane viscosity of from about 100 to 200,000 centipoises at 25° C. Preferably, R is selected from alkyl radicals of 1 to 8 carbon atoms, such as methyl, ethyl, propyl; mononuclear aryl radicals such as phenyl, methylphenyl, ethylphenyl; cycloalkyl radicals, cycloheptyl and haloalkyl radicals such as 3,3,3-trifluoropropyl. Preferably, the vinyl siloxane has terminal units of the formula,

which can vary from about 0.05 to about 3.5 mol percent, based on the total moles of chemically combined siloxy units and preferably from 0.14 to about 2 mole percent.

The vinylsiloxane of Formula (1) is generally prepared by equilibrating the appropriate cyclotetrasiloxane with appropriate vinyl terminated low molecular weight polysiloxane chain-stoppers. However, if vinyl organosiloxy units are desired in the backbone, a predetermined amount of cyclic vinyl organosiloxane can be used in the equilibration mixture. A preferred chain-stopper for the equilibration reaction is a low molecular weight vinyl terminated organopolysiloxane such as the corresponding disiloxane, trisiloxane, tetrasiloxane. These low molecular weight vinyl terminated polysiloxane polymers are produced by hydrolyzing the appropriate chlorosilanes particularly vinyl diorganochlorosilanes along with diorganodichlorosilanes to produce the desired chain-stopper. The chain-stopper can be equilibrated with octamethylcyclotetrasiloxane in the presence of a catalyst to produce the desired vinyl siloxane having a viscosity varying from 100 to 200,000 centipoises at 25° C. The catalyst that is utilized is preferably a mild acid catalyst, such as toluenesulfonic acid or an acid treated clay such as Filtrol, which is a sulfuric acid activated clay manufactured and sold by Engelhard Corp. of Edison, N.J. When the equilibration has proceeded to about 85% completion, the acid catalyst can be neutralized with a base or simply filtered if acid activated clay is used to provide linear polymer Preferably, excess cyclics are stripped off so that the linear polymer will have a low volatile content and be relatively pure. There can also be utilized an alkali metal hydroxide as the catalyst such as for instance potassium or sodium hydroxide.

The term vinyl silicone or vinyl siloxane also can include silicone mixtures having from 0 to 75 parts of three dimensional resins shown by F. J. Modic, U.S. Pat. No. 4,418,157 (1983) which is incorporated by reference. For example, a first resin can be in the form of a resinous copolymer having two functional units such as $R_3SiO_{0.5}$ units and $SiO_2$ units ranging from about 0.25 to about 0.8:1 and a second resin can have three functional units such as copolymers comprising $(R)_3SiO_{0.5}$ units, $(R^1)_2SiO$ units and $SiO_2$ units, the ratio of monofunctional $R_3SiO_{0.5}$ units to tetrafunctional $SiO_2$ units being from about 0.25 to about 1.5:1 and the ratio of difunctional $(R^1)_2SiO$ units to tetrafunctional units being from 0 to about 0.5:1, where R is as previously defined and $R^1$ is a member selected from the class consisting of R radicals as previously defined and $C_{(2-8)}$ alkenyl radicals such as vinyl and allyl. In one preferred embodiment R of the first resin formed of monofunctional and tetrafunctional units is methyl so that the first resin has $(CH_3)_3SiO_{0.5}$ units and $SiO_2$ units. With the second resin, preferably R is methyl and $R^1$ is methyl and/or vinyl so that there is provided the following resins:

| | |
|---|---|
| $(CH_3)_3SiO_{0.5}$, $SiO_2$, $(CH_3)_2SiO$ | (a) |
| $(CH_3)_3SiO_{0.5}$, $SiO_2$, $(CH_3)(CH_2=CH)SiO$ | (b) |
| $(CH_3)_3SiO_{0.5}$, $SiO_2$, $(CH_2=CH)_2SiO$ | (c) | and various mixtures of the above resins.

In a preferred embodiment of the three dimensional resins, the monofunctional groups have the formula,

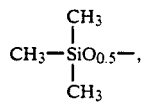

and the difunctional groups have the formula,

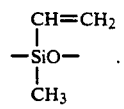

Of course, the preferred groups need not be bonded to each silicon atom so that there is greater flexibility in obtaining other desired properties.

Generally, in the first silicone resin, the ratio of $R_3SiO_{0.5}$ units to $SiO_2$ units ranges from about 0.25 to about 1.5 and preferably 0.5 to 1.0:1. In the case of the second silicone resin, the ratio of $R_3SiO_{0.5}$ units to $SiO_2$ units ranges from about 0.25 to about 1.5:1 preferably from about 0.5 to about 1.0 and the ratio of $(R^1)_2SiO$ units to $SiO_2$ units ranges from 0 to about 0.5:1 preferably from 0 to about 0.25. Generally there can be anywhere from about 10 to about 75 parts by weight based on the weight of the base organopolysiloxane.

The above resins are known in the art and can be prepared by any of several methods, for example, as described in Daudt et al., U.S. Pat. No. 2,676,182, Sauer, U.S. Pat. No. 2,398,672, Dexter, U.S. Pat. No. 2,736,721, and Goodwin, Jr., U.S. Pat. No. 2,857,356.

Included within the silicon hydride siloxane of the invention is a "coupler", having the formula,

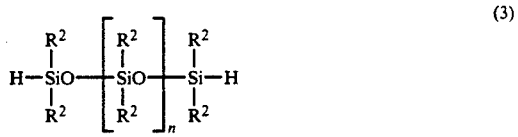
(3)

where $R^2$ is selected from $C_{(1-13)}$ monovalent hydrocarbon radicals free of olefinic unsaturation and n is an integer having a value sufficient to provide the "coupler" with a viscosity of 1 to 500 centipoises at 25° C. and from about 3 to 9 mole percent of chain-stopping diorganohydride siloxy units, based on the total moles of chemically combined siloxy units in the silicon hydride siloxane fluid.

In addition to the silicone hydride coupler of formula (3), the silicon hydride siloxane used in the heat curable organopolysiloxane compositions of the present invention also can include silicon hydride resins consisting essentially of the following chemically combined units,

chemically combined with $SiO_2$ units, where the $R^3+H$ to Si ratio varies from 1.0 to 2.7. Silicon hydride resin also can have units of the formula,

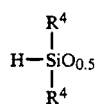

chemically combined with $SiO_2$ units and $(R^5)_2SiO$ units, where the $R^4+R^5+H$ to Si ratio varies from 1.2 to 2.7, where $R^3$, $R^4$ and $R^5$ are $C_{(1-13)}$ monovalent hydrocarbon radicals free of olefinic unsaturation selected from $R^2$ radicals The silicon hydride siloxane can be made by hydrolyzing the corresponding hydride chlorosilanes in the presence of an organic hydrocarbon solvent. For resins having only monofunctional units and tetrafunctional units, a hydrogen diorganochlorosilane can be hydrolyzed with a tetrachlorosilane. Resins having monofunctional siloxy units, difunctional siloxy units, and tetrafunctional siloxy units, can be obtained by hydrolyzing a hydrogen diorgano dichlorosilane, a tetrachlorosilane and a diorganodichlorosilane at particular ratios. Additional silicon hydride resin are shown by Jeram, U.S. Pat. No. 4,040,101 which is hereby incorporated by reference.

The silicon hydride siloxane also can include linear hydrogen containing polysiloxane having the formula,

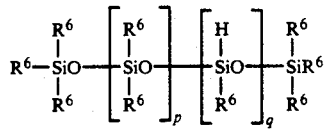

(4)

where $R^6$ is a $C_{(1-13)}$ monovalent hydrocarbon radical free of olefinic unsaturation, selected from $R^2$ radicals, and p and q are integers having values sufficient to provide a polymer having a viscosity of from 1 to 1,000 centipoises at 25° C., and wherein the polysiloxane has from 0.04 to 1.4 by weight of hydrogen.

The silicon hydride siloxane of formula (4) can be produced by equilibrating the appropriate hydrogencyclopolysiloxane with the appropriate cyclopolysiloxane containing $R^6$ substituent groups, in combination with low molecular weight linear triorganosiloxy endstopped chain-stoppers.

In formulas (3) and (4) and the chemically combined units described above, $R^2$, $R^3$, $R^4$, $R^5$ and $R^6$ can be the same or different radicals selected from the group consisting of alkyl radicals of 1 to 8 carbon atoms, such as methyl, ethyl, propyl, etc.; cycloalkyl radicals such as cyclohexyl, cycloheptyl, etc.; aryl radicals such as phenyl, tolyl, xylyl, etc.; and haloalkyl radicals such as 3,3,3-trifluoropropyl.

The silicon hydride coupler of formula (3) can be prepared by a hydrolysis process or an acid catalyzed equilibration process. In the equilibration process the appropriate cyclotetrasiloxanes are equilibrated with a low molecular weight hydrogen terminated chain-stopper, such as a dihydrogen tetraorganodisiloxane. The acid catalyzed equilibration reaction is much the same as disclosed for the production of the vinyl containing base polymer. By the hydrolysis process, the appropriate hydrogen diorganochlorosilanes are hydrolyzed with the appropriate amount of diorganodichlorosilanes to produce the desired polymer of formula (3) above. The resulting siloxane hydride can be separated from undesirable cyclics by stripping.

Platinum group metal catalysts which can be employed in the one part heat curable compositions of the present invention include those based on the metals rhodium, ruthenium, palladium, osmium, iridium and platinum. Especially preferred are the well known platinum and rhodium catalysts, such as the platinum hydrocarbon complexes described in U.S. Pat. No. 3,159,601 and 3,159,662 to Ashby, the platinum alcoholate catalysts described in U.S. Pat. No. 3,220,970 to Lamoreaux, the platinum complexes of U.S. Pat. No. 3,814,730 to Karstedt, the platinum chloride-olefin complexes described in U.S. Pat. No. 3,516,946 to Modic and the rhodium complexes described in U.S. Pat. No. 4,262,107 to Eckberg, all of which are incorporated herein by reference.

An effective amount of the platinum group metal catalyst of the present invention is that amount which is sufficient to provide from 5 ppm to 200 ppm of platinum group metal based on the weight of heat curable organopolysiloxane compound composition, and preferably from 10 ppm to 100 ppm.

Inhibitors which can be used to extend the shelf life of the curable organopolysiloxane mixture are for example, dimethylmaleate, diallylmaleate, diethylazodicarboxylate, diisopropylazodicarboxylate, 2,2'-bipyridine, 4-methylbutyn-1-ol, 4-phenyl-1,2,4-triazoline-3,5-dione and 2-butanone peroxide. The inhibitors can be used at 0.001 to 0.5 parts per 100 parts by weight of curable organopolysiloxane mixture.

In the practice of the method of the present invention the addition curable organopolysiloxane mixture of the vinyl silicone fluid and the silicon hydride siloxane fluid can be prepared containing an effective amount of a platinum catalyst. Alternatively, in the event a latent platinum catalyst is not employed, such as disclosed in Lewis et al U.S. Pat. No. 5,015,691, Lewis et al, U.S. Pat. No. 5,025,073, or copending application Ser. No. 07/800,311, a two part addition curable organopolysiloxane composition can be prepared by forming a mixture of the vinyl silicone fluid and silicon hydride siloxane fluid and an effective amount of a platinum group metal catalyst.

There can be incorporated in the ultrasonic energy curable organopolysiloxane compositions of the present invention from 5 to 100 parts by weight of a filler based on 100 parts by weight of the vinyl siloxane. The filler can be selected from fumed silica, precipitated silica and mixtures thereof. Preferably less than 50 parts by weight of filler, per 100 parts by weight of the vinyl siloxane is utilized. In place of the reinforcing filler, such as fumed silica, and precipitated silicas, there also may be utilized extending fillers. Additional reinforcing and various extending fillers are for instance, titanium dioxide, lithopone, zinc oxide, zirconium silicate, silica aerogel, iron oxide, diatomaceous earth, calcium carbonate, silazane treated silicas, glass fibers, magnesium oxide, chromic oxide, zirconium oxide, aluminum oxide, alpha quartz, calcined clay, carbon, graphite, cork, cotton, synthetic fibers and so forth.

For liquid injection molding applications, it has been found desirable to limit the viscosity below 500,000 centipoises at 25° C. and more preferably, below 200,000 centipoises at 25° C.

Cure of the ultrasonic energy curable organopolysiloxane compositions of the present invention can be achieved at energy levels of from 10 kHz to 50 kHz at $5 \times 10^{-5}$ to 100 watts/cm²/sec and preferably 20 to 30 kHz at 0.1 to 50 watts/cm²/sec.

In order that those skilled in the art will be better able to practice the present invention, the following examples are given by way of illustration and not by way of limitation. All parts are by weight.

EXAMPLE 1

A one part addition curable mixture was prepared with 48 g of a mixture of 50 parts of a vinyl terminated polydimethylsiloxane fluid having a viscosity of 280 centipoises and 49 parts of α-quartz having an average particle size of 10 μm and 1 part of carbon black which was utilized in combination with a latent platinum catalyst prepared adding 29.1 μL ($6.41 \times 10^{-6}$ mol Pt) of platinum catalyst shown by Karstedt, U.S. Pat. No. 3,775,452 to a solution of 0.015 g ($9.62 \times 10^{-5}$ mol) of 2,2'-bipyridine (BIPY) in 1 mL of $CH_2Cl_2$. The silicone-platinum catalyst reaction mixture was stirred for 4 hours at room temperature. The mixture was stirred until it was homogeneous. There was added to this mixture, 2 g of a silicon hydride siloxane crosslinker having a viscosity of 150 centipoises and 0.8 % of hydrogen. The formulation was mixed for approximately 2 minutes to provide a homogeneous silicone addition cure formulation having a viscosity of 810 centipoises and containing 25 ppm of platinum.

A 31 g portion of the above addition cure formulation was exposed for 105 seconds to a Branson 184V ultrasound system generator with a titanium horn (4.9 cm² area) operated at 100% power (850 watts) and 20 kHz for a 1.6 watts/cm²/sec exposure resulting in a cure. It was found that 31 g of the same mixture required 25 minutes in an oven set at 150° C. to effect a substantially similar cure.

EXAMPLE 2

A one part addition curable organopolysiloxane mixture was prepared by combining 100 parts of a vinyl polydimethylsiloxane blend of 2 polydimethylsiloxanes having terminal vinyl dimethylsiloxy groups consisting of a three to one ratio by weight of a polydimethylsiloxane fluid having a viscosity of 4000 centipoises and a resin consisting of trimethylsiloxy units, methylvinylsiloxy units and tetrasiloxy units. The blend was combined with 25 ppm of platinum as a latent catalyst of an inclusion compound of a 1:1 complex of 1,5-cyclooctadiene-platinum dichloride and $\beta$-cyclodextrin as shown by Lewis et al, U.S. Pat. No. 5,025,073. There was added to the resulting mixture, 4.5 parts of a silicon hydride siloxane crosslinker consisting essentially of dimethylhydrogensiloxy units and tetrasiloxy units having 0.95 weight % hydrogen. A 20 g sample of the resulting one part formulation was found to cure in three minutes in accordance with the procedure of example 1. It was estimated that about 1 watt/cm²/sec exposure required for cure.

EXAMPLE 3

A two-part addition curable organopolysiloxane formulation was prepared by combining the vinyl polydimethylsiloxane blend of example 2 with 25 ppm of platinum in the form of a platinum complex as described by Karstedt, U.S. Pat. No. 3,725,452. There was added to the resulting mixture a silicon hydride crosslinker of example 2 resulting in the formation of a two-part addition curable organopolysiloxane formulation having about 75 parts of the vinyl polydimethylsiloxane blend, 4.5 parts of silicon hydride siloxane crosslinker and 25 ppm of platinum. The resulting addition curable mixture was stable for over 2 hours under ambient conditions. However, when it was exposed to ultrasound in accordance with the procedure of example 1, it gelled in less than 30 seconds.

Although the above examples are directed to only a few of the very many variables which can be used in the practice of the method of the present invention, it should be understood that the present invention is directed to the use of a much broader variety of addition curable organopolysiloxane formulations either in one-part or two-part form as set forth in the description preceding these examples.

What is claimed is:

1. A method for initiating a hydrosilylation reaction at ambient temperatures in a fluid organopolysiloxane mixture by the use of ultrasonic energy, comprising generating ultrasonic energy from an ultrasonic energy source while it is in contact with the organopolysiloxane mixture comprising a vinyl silicone, a silicon hydride siloxane and an amount of a soluble or homogenous platinum group metal catalyst to effect addition between the vinyl silicone and the silicon hydride siloxane.

2. A method which comprises,
   (1) forming a fluid mixture having a viscosity of from about 100 to 1,000,000 centipoise which is capable of resisting a substantial increase in viscosity over a period of at least 2 hours at 25° C., which fluid mixture comprises by weight,
      (a) 100 parts of a vinyl silicone,
      (b) from about 1 to about 40 parts of a silicon hydride siloxane, and
      (c) an amount of a platinum group metal catalyst which is effective as a hydrosilylation catalyst for (a), and (b) and,
   (2) contacting the mixture of (1) with an ultrasonic energy generator while it is generating a frequency of from about 10 to about 50 kHz and a power output at point of contact with the mixture of (1) at $5 \times 10^{-5}$ to 100 watts/cm²/sec until the viscosity of the mixture of (1) is increased by about a factor of at least two.

3. A method in accordance with claim 1, where the vinyl silicone is a vinyl terminated polydimethylsiloxane fluid.

4. A method in accordance with claim 1, where the silicon hydride siloxane is a silicon hydride polydimethylsiloxane fluid.

5. A method in accordance with claim 1, where the fluid organopolysiloxane mixture is in the form of a one-part addition curable mixture.

6. A method in accordance with claim 1, where the fluid organopolysiloxane mixture is a two-part addition curable mixture.

7. A method in accordance with claim 1, which employs a latent platinum catalyst.

8. A method in accordance with claim 1, which employs a platinum catalyst inhibitor.

9. A silicone rubber made in accordance with the method of claim 1.

10. A silicone potting gel made in accordance with the method of claim 1.

11. A method in accordance with claim 1, where the fluid organopolysiloxane mixture is a coating composition.

12. A method in accordance with claim 1, where the platinum group metal catalyst is an inclusion compound of $\beta$-cyclodextrin and a platinum complex.

* * * * *